US011977281B2

United States Patent
Rodrigues et al.

(10) Patent No.: US 11,977,281 B2
(45) Date of Patent: May 7, 2024

(54) INTEGRATED PHOTONIC COMPONENT FOR ENHANCED MODE OVERLAP OF A 2D PHASE SHIFTER

(71) Applicant: Toyota Motor Engineering & Manufacturing North America, Inc., Plano, TX (US)

(72) Inventors: Sean P. Rodrigues, Ann Arbor, MI (US); Paul Donald Schmalenberg, Pittsburgh, PA (US); Yuqing Zhou, Ann Arbor, MI (US); Ercan Mehmet Dede, Ann Arbor, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 483 days.

(21) Appl. No.: 17/235,416

(22) Filed: Apr. 20, 2021

(65) Prior Publication Data

US 2022/0334414 A1 Oct. 20, 2022

(51) Int. Cl.
*G02F 1/00* (2006.01)
*G02B 6/293* (2006.01)
(Continued)

(52) U.S. Cl.
CPC ......... *G02F 1/0054* (2013.01); *G02B 6/2935* (2013.01); *G02F 1/011* (2013.01); *G02F 1/225* (2013.01); *G02F 2201/12* (2013.01)

(58) Field of Classification Search
CPC ........ G02F 1/0054; G02F 1/011; G02F 1/225; G02F 2201/12; G02B 6/14; G02B 6/3596; G02B 6/2935
See application file for complete search history.

(56) References Cited

U.S. PATENT DOCUMENTS 10,823,913 B1 * 11/2020 Moebius ................ G02B 6/355
10,866,487 B1 * 12/2020 Keller ..................... G02F 1/365
(Continued)

OTHER PUBLICATIONS

Datta, I. et al., "Low-loss composite photonic platform based on 2D semiconductor monolayers," Nature Photonics, 14, 4, 2020, pp. 256-262.
(Continued)

*Primary Examiner* — Ryan A Lepisto
*Assistant Examiner* — Erin D Chiem
(74) *Attorney, Agent, or Firm* — Christopher G. Darrow; DARROW MUSTAFA PC

(57) ABSTRACT

A silicon on insulator (SOI) photonic device having a waveguide is provided that includes a mode overlap portion with a topology optimized structure situated below an electrode of the capacitance structure. The device can significantly change a refractive index in a volume of mode overlap depending upon the applied potential to the capacitor and allows for a π phase shift in a modest mode overlap volume. The topology optimized structure has a waveguide and substrate that are partitioned in three dimensions using an extruded projection design. The electrode is a transition metal di-chalcogenide monolayer sheet (2D TMD). The enhanced mode overlay from the topology optimized waveguide portion allows a large reduction in the length of the waveguide with the mode overlap to achieve the needed phase shift for a photonic device.

19 Claims, 8 Drawing Sheets

(51) Int. Cl.
  *G02F 1/01*    (2006.01)
  *G02F 1/225*   (2006.01)

(56) References Cited

U.S. PATENT DOCUMENTS

| | | | |
|---|---|---|---|
| 11,121,271 B2* | 9/2021 | Wang | H01L 31/035281 |
| 11,209,677 B1* | 12/2021 | Roxworthy | G02F 1/212 |
| 11,320,588 B1* | 5/2022 | Mazed | G16H 10/40 |
| 2019/0258088 A1 | 8/2019 | Lipson et al. | |
| 2021/0044748 A1* | 2/2021 | Hu | G02B 1/002 |
| 2022/0163638 A1* | 5/2022 | Lin | G01S 7/4813 |

OTHER PUBLICATIONS

Frandsen, L.H. et al., "Broadband Photonic Crystal Waveguide 60° Bend Obtained Utilizing Topology Optimization," Optics Express 2004, 12, 24, pp. 5916-5921.

Lebbe, N. et al., "Robust Shape and Topology Optimization of Nanophotonic Devices Using the Level Set Method," J. Comp. Physics 2019, 395, pp. 710-746.

Maiti, R. et al., "Loss and Coupling Tuning Via Heterogeneous Integration of MoS2 Layers in Silicon Photonics," Optical Materials Express 2019, 9, 2, pp. 751-759.

Piggott, A.Y. et al., "Fabrication-Constrained Nanophotonic Inverse Design," Scientific Reports 2017, 7, p. 1786 (Stanford University).

Su, L. et al., "Inverse Design and Demonstration of a Compact on-Chip Narrowband Three-Channel Wavelength Demultiplexer," ACS Photonics 2018, 5, 2, pp. 301-305 (Stanford University).

Taghinejad, M. et al., "Photocarrier-Induced Active Control of Second-Order Optical Nonlinearity in Monolayer MoS2," Small 2020, 16, 8 pages.

* cited by examiner

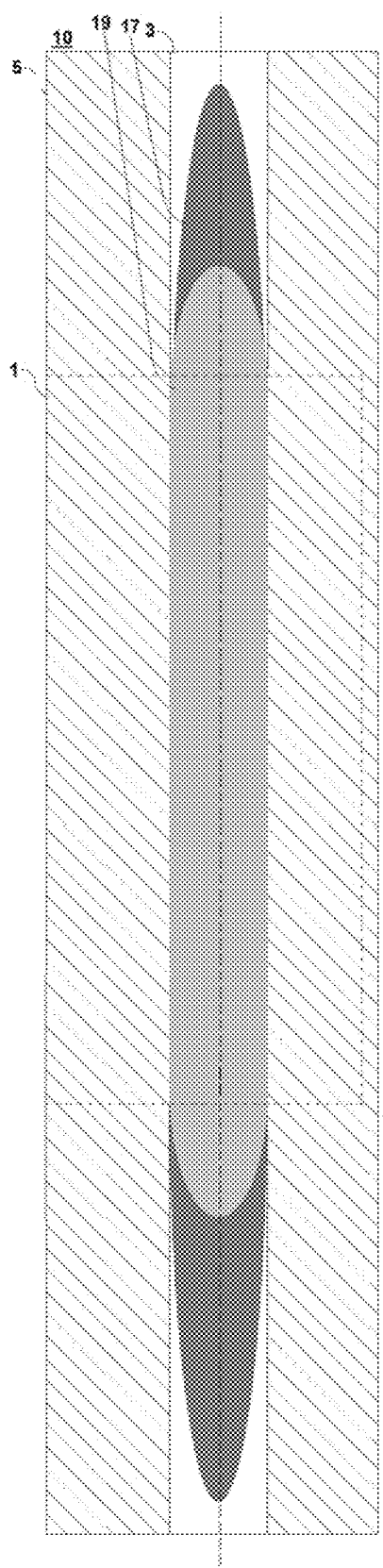
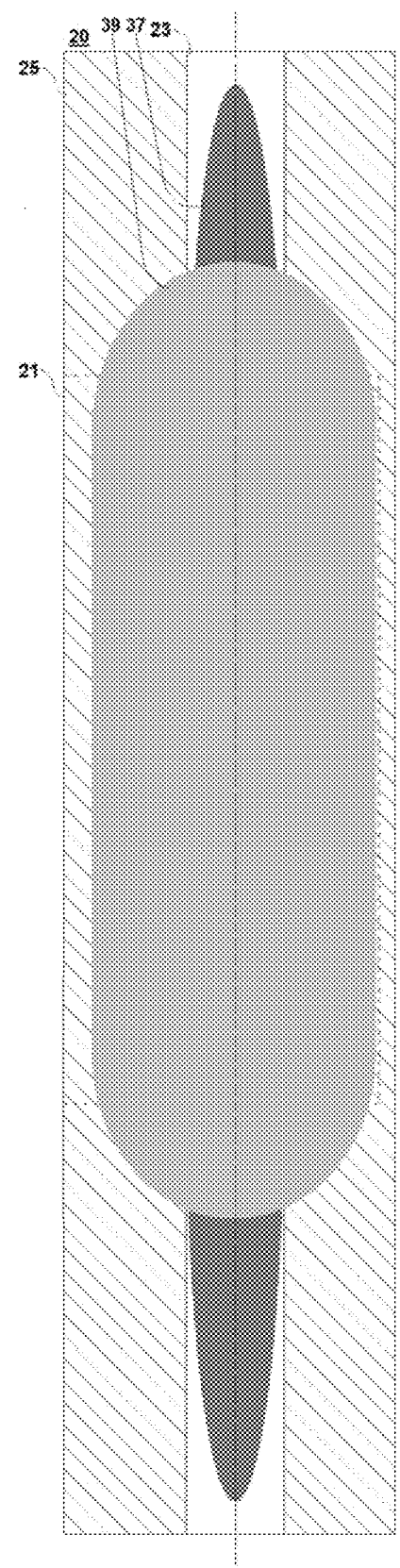
FIG. 3A
*Prior Art*
FIG. 3B

INTEGRATED PHOTONIC COMPONENT FOR ENHANCED MODE OVERLAP OF A 2D PHASE SHIFTER

TECHNICAL FIELD

The present disclosure generally relates to a photonic device for implementation of a phase shift of photons.

BACKGROUND

Phase shifters are critical electro-optic components for optical processing in integrated photonic devices. Thermo-optic phase-shifters (TOPS) and optical waveguide heaters, are widely used for applications such as sensing, switching, communications, neural networks, and LiDAR. Integrated photonic phase shifters have been designed using thermo optical elements or ionically doped semiconductors within the waveguide of a photonic device, and often suffer from high optical losses or high-power requirements. Electro-optic modulators using a silicon-on-insulator have been examined using plasma dispersion effect and lithium niobate, but these display problems with carrier injection losses and low refractive index changes, respectively.

Recently, a device based on a 2D monolayer transition metal dichalcogenide (TMD) situated over a SiN waveguide has been disclosed. The position of the TMD over the waveguide provides enough modal overlap to induce a phase shift in the propagating wave. A change in the refractive index of the TMD is achieved by application of a DC voltage across the TMD. Via the Kerr effect, the 0 to π phase shift required for the phase shifting device is achievable. However, the effective length of the waveguide under the TMD in the Mach-Zehnder interferometer (MZI) architecture of the TMD based photonic device is many hundreds of microns in length to achieve the π phase shift. To this end, a modification in the architecture to reduce this length is desirable.

SUMMARY

This section provides a general summary of the disclosure and is not a comprehensive disclosure of its full scope or all its components.

In various aspects, the present teachings provide a photonic device that allows a phase shift of π on demand. The phase shift is provided by applying a potential to a capacitance structure with an electrode that includes a transition metal di-chalcogenide monolayer sheet (2D TMD), which changes in refractive index depending upon the applied potential. The photonic device is composed of several photonic structures. The waveguide buses the light to the phase shifter portion that is created from a topology optimized structure. The waveguide and phase shifter are created on the substrate through a lithography process. The phase shifter is designed from an extruded projection and is situated below the 2D material. This phase shifting photonic device has a 2D TMD over the waveguide on a silicon on insulator (SOI) substrate, where a topology optimized waveguide portion. For example, a Mach-Zehnder interferometer (MZI) including a coupler that combines two propagating modes and a phase shifter benefits from enhanced mode overlap with the 2D TMD, such that a portion with mode overlap can be shortened relative to state-of-the-art devices employing a 2D TMD. An increase in mode overlap occurs where the 2D TMD structure interacts with a broader piece of the 3D optical wave such that the wave has a greater phase change. The topology optimized waveguide disperses the optical mode in the region of the 2D TMD. The increased overlap created by the topology optimized structure enhances the interaction between the optical mode and the TMD, thereby inducing the potential for a larger refractive index change/phase shift. An optimized topology has a half symmetry edge with an extruded projection into a perpendicular dimension projected into an out of edge plane. The projection is extended on both sides of the edge, which then constitutes the center of the large area of the topology optimized portion of the waveguide that is projected symmetrically from the center. In this manner, the typical silicon waveguide cladded by $SiO_2$ has a waveguide having a distribution of Si within the $SiO_2$ support. The 2D TMD is a monolayer, which can be in the form of a film or flake that can be placed or deposited on a SOI structure of the device. Charge can be introduced in the 2D TMD by its inclusion as part of a parallel plate capacitor configuration where a dielectric and a conducting contact is included. In the capacitor, the potential applied across the TMD and conductor introduces an electron distribution across the device, which shifts the excitonic resonance at near-IR wavelengths.

In other aspects, the present teachings provide a method for providing an optical phase shift. The method may include transmitting a near-infrared (near-IR) beam in a waveguide including an MZI architecture such that a π shift can be achieved without a long, generally bending, waveguide. By employing a Si waveguide that can be patterned by common lithographic methods, a topology optimized structure is possible where the extruded projected pattern can reduce the length for a π shift ($L_\pi$) by about an order of magnitude and remove any need for bends that can contribute to losses. Because a reduction in the size of the phase shifter, allows a reduction in the size of the MZI/modulator/interferometer, the reduction of length, and size, allows more components to be implemented on the chip and increase functionality. The method involves transmitting a wave through a topology optimized waveguide that causes a broadening of the mode in the dimensions perpendicular to the direction of wave propagation. The overlap with a 2D TMD included in a capacitance structure allows the tuning of the TMD's RI and its interaction with light transmitted along the waveguide upon imposing a controlled DC voltage to the capacitor.

Further, the present disclosure provides an improved electro-optical device including a phase shifter. The electro-optical device has a 2D TMD providing a tunable refractive index and a topology optimized waveguide under the 2D TMD such that mode overlap is enhanced. The length of the waveguide from the wave input to the wave output is less than about 20 microns.

BRIEF DESCRIPTION OF THE DRAWINGS

The present teachings will become more fully understood from the detailed description and the accompanying drawing, wherein:

FIG. 3A is a drawing showing a cross-section exposing the waveguide of a prior art device in a plane extended along its length, where the area covered by the 2D TMD is indicated by the dashed line where a representation of the mode as it passes through the waveguide, and where it senses the 2D TMD is indicated by the darker and lighter shaded areas, respectively.

FIG. 3B is a drawing showing a cross-section exposing the waveguide in a plane extended along its length, where the area covered by the 2D TMD is indicated by the dashed line where a representation of the mode as it passes through the waveguide, and where it senses the 2D TMD is indicated by the darker and lighter shaded areas, respectively, according to an embodiment.

Figure 1A:
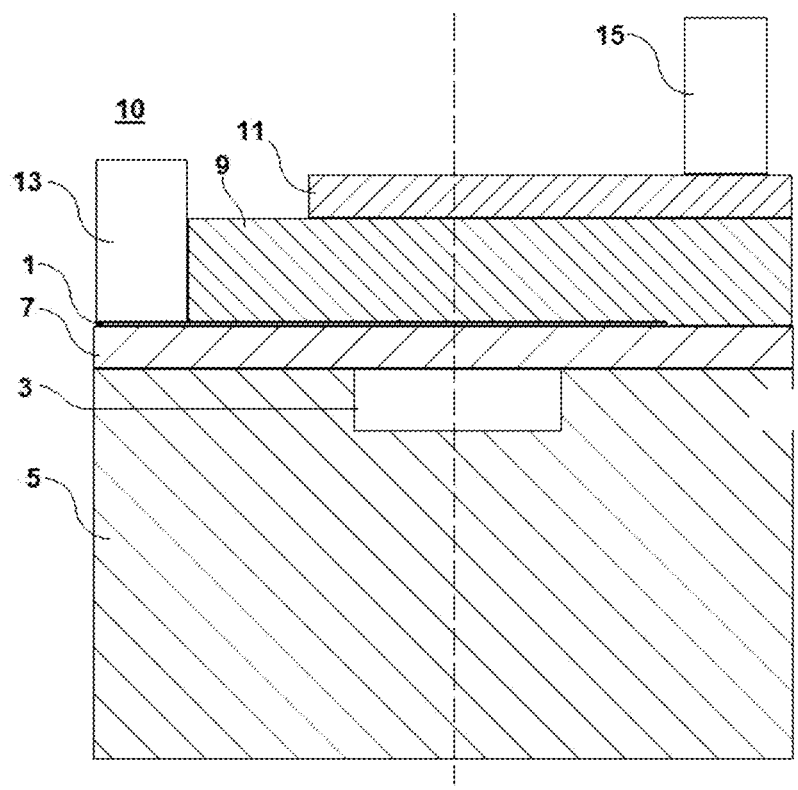
FIG. 1A is a drawing showing a cross-section of a prior art device where the waveguide is a SiN rectangular feature in a $SiO_2$ layer situated under a 2D TMD.

It should be noted that the figures set forth herein are intended to exemplify the general characteristics of the methods, algorithms, and devices among those of the present technology, for the purpose of the description of certain aspects. These figures may not precisely reflect the characteristics of any given aspect and are not necessarily intended to define or limit specific embodiments within the scope of this technology. Further, certain aspects may incorporate components from a combination of figures.

DETAILED DESCRIPTION

The present technology generally provides a photonic device employing a low loss phase shifter that includes a 2D TMD transition metal di-chalcogenide monolayer sheet (2D TMD) that can vary in refractive index upon an applied voltage potential. The waveguide under the 2D TMD is a topology optimized structure designed using an extrusion projection method. A patterned topology allows the broadening of the optical modes in the dimensions perpendicular to the waveguide's length and diverts a larger portion of the mode towards the 2D TMD such that the mode overlap is significantly increased relative to a normal waveguide channel. As used herein, reference to a "mode overlap" is with respect to an overlap between an optical wave and the 2D TMD, as will be discussed and illustrated in more detail below. In this manner, a low-loss phase shifter that has a length under a 2D TMD can be less than about 20 microns, such that the photonic device can be small. The 2D TMD is a portion of a capacitive structure, where the variation of its refractive index is large relative to a bulk TMD. The integrated photonic device may be a silicon on insulator (SOI) device.

In another aspect, the present teachings provide a method for achieving a phase shift in a Mach-Zehnder interferometer (MZI), microring resonator, or other modulator device, with a phase shift of at least π. The method comprises transmitting a near-infrared (near-IR) beam in a waveguide in a MZI architecture such that a π shift can be achieved without a bending or long waveguide. By employing a Si waveguide that can be patterned by common lithographic methods, a topology optimized structure is possible where the extruded projected pattern can reduce the length for a π shift ($L_π$) by about an order of magnitude and remove any need for unnecessary bends that can contribute to losses. Waveguides can be fabricated from Si, SiN, SiC, or semiconductive materials including any III-V, II-VI, or IV-VI group elements. The method involves transmitting a wave through the topology optimized waveguide for broadening the mode in the dimensions perpendicular to the direction of wave propagation. The overlap with a 2D TMD included with a capacitive structure allows the tuning of the TMD's RI where the topology optimized structure changes the 2D TMD's interaction with the photons, the mode overlap, transmitted along the waveguide, the optical mode, by imposing a controlled DC voltage to the capacitor structure. Alternatives to the MZI modulator can include other optical or electro-optical modulators.

In another aspect, the present teachings provide an improved electro-optical device including a phase shifter. The electro-optical device has a 2D TMD as an electrode in a capacitance structure, providing a tunable refractive index. A topology optimized waveguide is disposed under the 2D TMD such that mode overlap is enhanced and the length of the waveguide from the wave input to the wave output is less than about 20 microns. The 2D TMD is tuned by a small potential requiring little amperage, for example less than a microamp, and DC power consumption less than a microwatt. The electro-optic devices can include or form a portion of one or more optical networks, phased arrays, optical delay lines, multiplexer, demux, and other optical processing devices.

The phase shifting device includes at least one 2D TMD, for switching of its RI with a large difference when incorporated as an electrode in a capacitance structure, where the RI difference for the monolayer upon application of a potential is significantly greater than that of the bulk material. The 2D TMD can be selected from any transition metal di-chalcogenide, such as, but not limited to $WS_2$, $WSe_2$, $MoS_2$, $MoSe_2$, or $MoTe_2$. The TMD can be of the transition metals Mo, W, Ti, and Mn; and the chalcogen of S, Se, and Te. A combination of two chalcogenides can be included in the sheet. Two or more different 2D TMDs can be employed in a photonic device. The TMD can be a Janus TMD. Different portions of the device can comprise different TMDs. The TMD can be deposited on the SOI substrate containing the waveguide in any manner, including, but not limited to, exfoliation, atomic layer deposition, chemical vapor deposition, and molecular beam epitaxy. The capacitor's dielectric can be $HfO_2$, $Al_2O_3$, $TaO_5$ or any high-κ dielectric. The other electrode can include ITO, graphene, CNTs or any other conductor that can be formed as a transparent electrode. Ionic liquids or other means to assure a good connection between dissimilar surfaces employed as components of the capacitance structure can be included. Optical transparency of the capacitance structure can be advantageous.

The electrical energy can be applied to cause negative or positive charge to accumulate at the 2D TMD, and the opposite at the other electrode of the capacitor. Where two different capacitors are employed for two different waveguides, the one may impose one net charge on one 2D TMD and the other may impose an opposite net charge on the other 2D TMD.

Figure 1B:
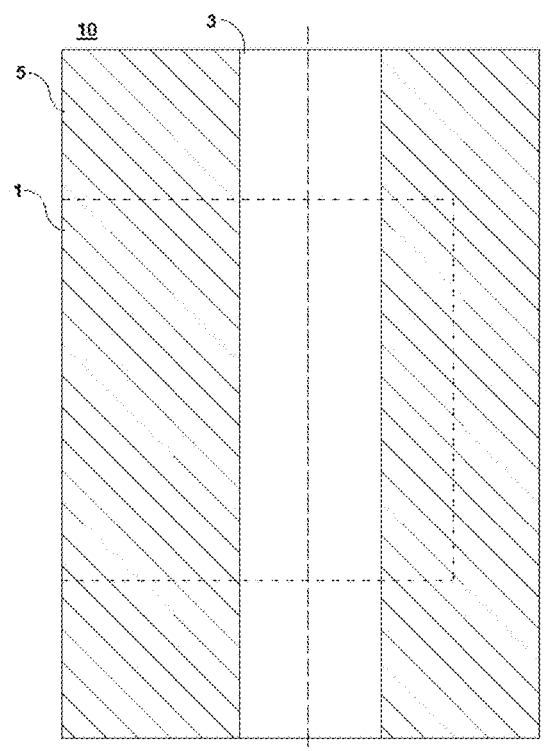
FIG. 1B is a drawing showing a cross-section exposing the waveguide in a plane perpendicular to the cross-section of FIG. 1A, where the area covered by the 2D TMD is indicated by the dashed line.
Figure 1C:
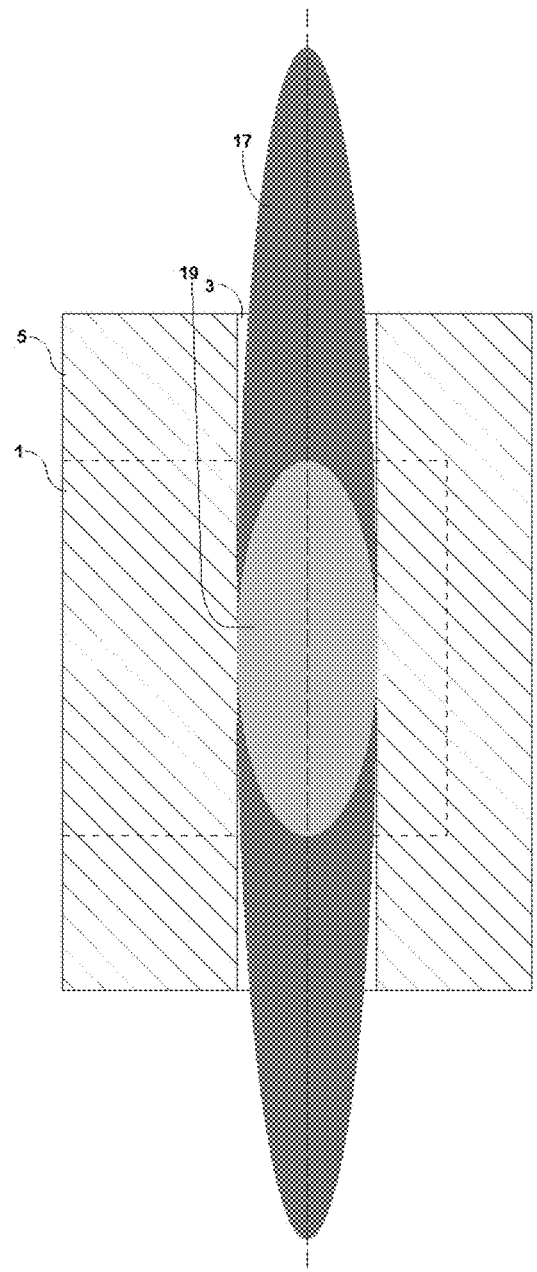
FIG. 1C is a drawing of the cross-section of FIG. 1B with a representation of the mode as it passes through the waveguide and where it senses the 2D TMD.

The waveguide placed in proximity to the 2D TMD is topology optimized to enhance the mode overlap between the near-IR wave with the 2D TMD. Normal wire-like waveguides, typically of widths and heights of approximately 500 nm and 200 nm, respectively, provide insufficient mode overlap to permit a 0 to π phase change in a length of less than a few hundred microns. Even larger waveguides, for example, in the prior art device illustrated in FIG. 1A, a relatively large SiN waveguide, with a thickness of 380 nm and width of about one micron, situated about 45 nm below a 2D TMD, requires an overlap length of 1.1 mm for a π shift. The device of FIG. 1A has a 2D TMD 1 as one portion of a capacitance structure with dielectric layer 9 and transparent electrode 11 that are connected to the circuit via conductors 13 and 15. The waveguide 3 is within a $SiO_2$ layer 5 with an insulator 7 separating the 2D TMD 1 from the waveguide 3. A top view of the waveguide in an arm of the MZI, shown in FIG. 1B for the device of FIG. 1A, has a relatively small waveguide cross-section, which results in a relatively narrow optical mode 17, shown in FIG. 1C, along the waveguide. This results in a relatively small mode overlap 19, suggested by the light ellipse in FIG. 1C, which requires significant waveguide length under the 2D TMD for an arm of a MZI arm. The inclusion of at least one 180-degree bend in the arms is typical for construction of the MZI having lengths ($L_π$), which can increase optical losses.

Figure 2A:
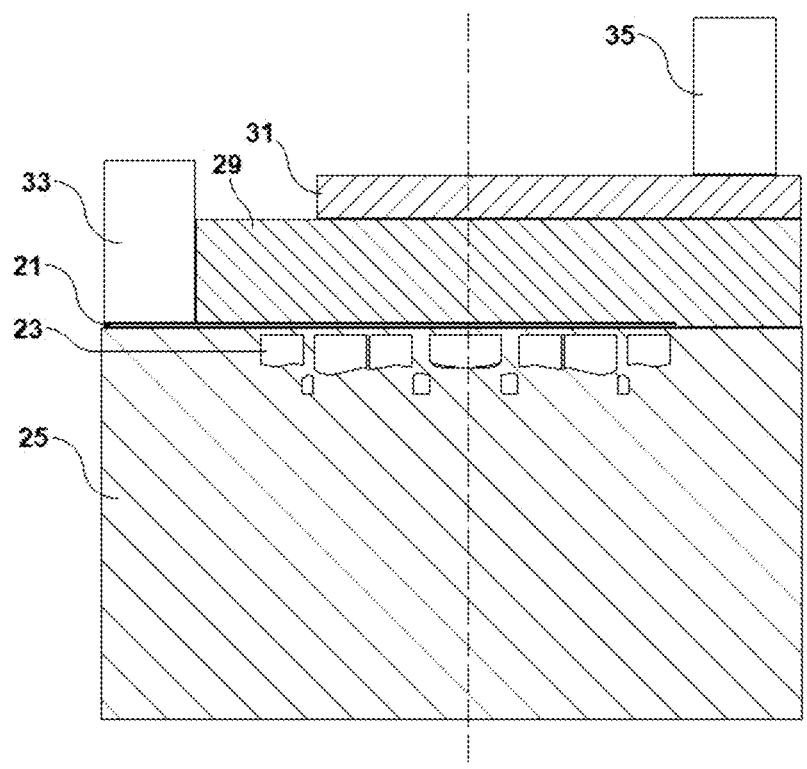
FIG. 2A is a drawing showing a cross-section of a simplified device where the waveguide is a symmetric, topology optimized Si waveguide residing under the 2D TMD within a $SiO_2$ layer, according to an embodiment.
Figure 2B:
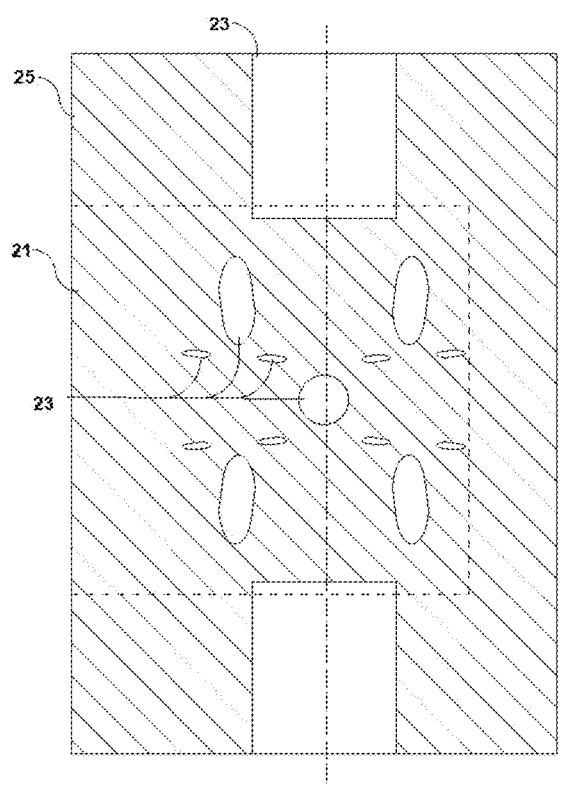
FIG. 2B is a drawing showing a cross-section exposing the symmetric, topology optimized waveguide in a plane perpendicular to the cross-section of FIG. 2A, where the area covered by the 2D TMD is indicated by the dashed line, according to an embodiment.
Figure 2C:
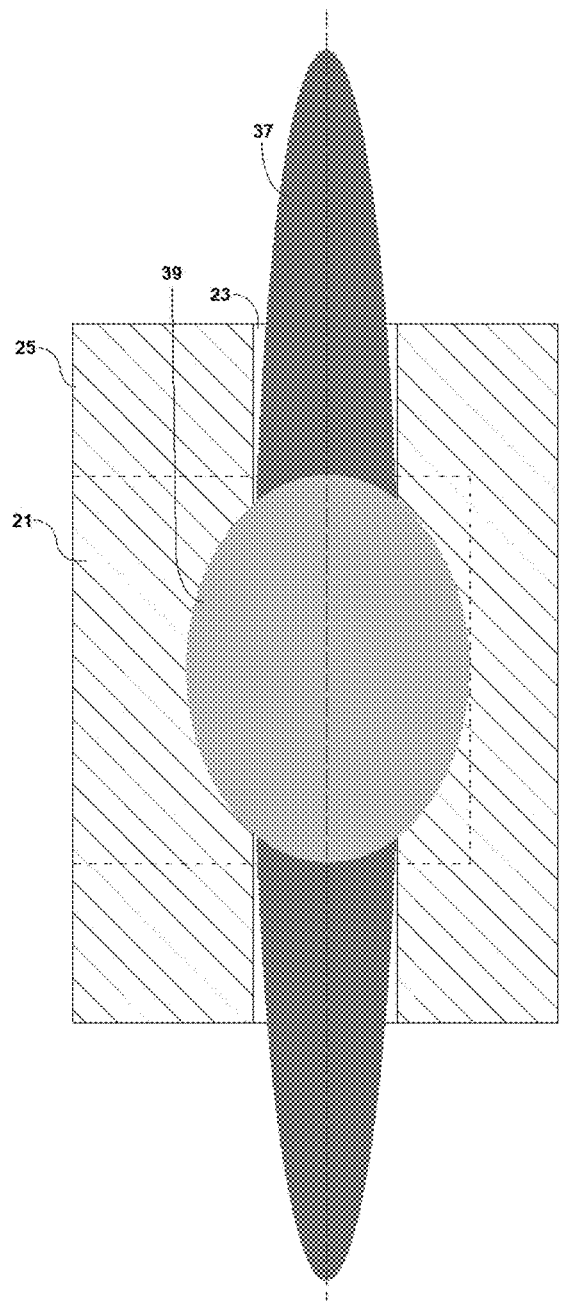
FIG. 2C is a drawing of the cross-section of FIG. 2B with a representation of the enhanced mode overlap as it passes through the symmetric topology optimized waveguide and where it senses the 2D TMD, according to an embodiment.

According to an embodiment of the present teachings, a topology optimized waveguide structure is employed to overcome this requirement of a long $L_π$. According to an embodiment, the phase shifter, as shown in FIGS. 2A and 2B employs a topology optimized waveguide 23 structure for positioning under the 2D TMD 21 that is formed by an extruded projection method. The capacitor structure includes similar dielectric 29, transparent electrode 31 and conductive connectors 33 and 35, configured as the prior art device. The partitioned and patterned waveguide 23 for optimized mode overlap under the 2D TMD 21 is formed to be within the $SiO_2$ layer 25. The shape and position of the topology optimized waveguide 23 results in the optical mode 37 having an enhanced mode overlap 39 relative to the more typical wire waveguide, as suggested in FIG. 2C. The optimized portion of the waveguide may be separated from the 2D TMD by less than about 40 nm to further enhance the mode overlap.

Figure 4B:
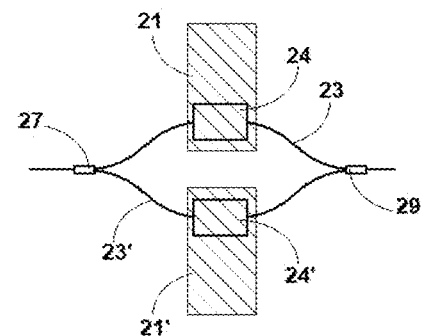
FIG. 4B is an MZI portion of the photonic device according to the present teachings.
Figure 4A:
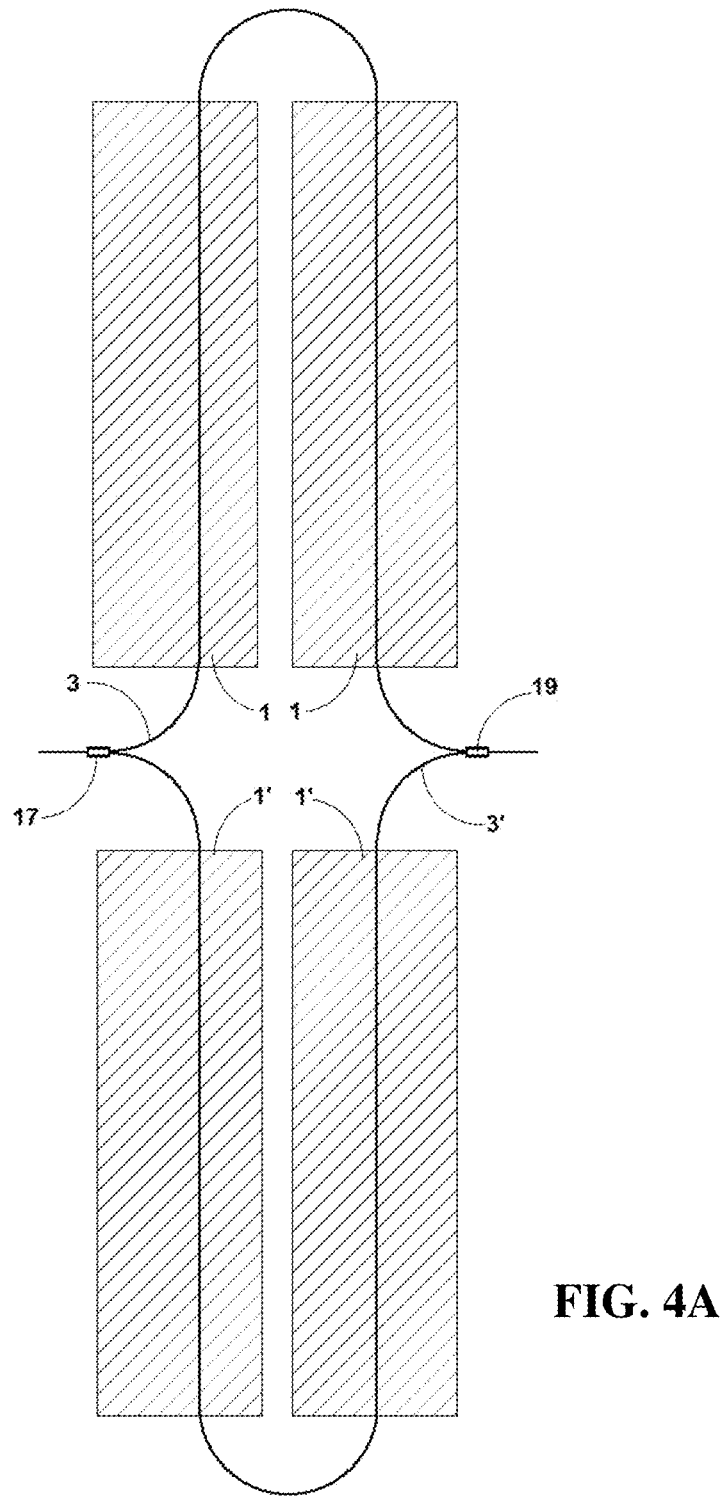
FIG. 4A is a symmetric MZI portion of the photonic device as in the prior art.

As illustrated in FIGS. 3A and 3B, the mode overlap is significantly enhanced over the area of the 2D TMD. This mode overlap increase allows a low loss phase shifter with short arms within an MZI structure and allows the avoidance of bends to compensate for the waveguide length. A reduction of length about ten-fold or more is achievable, as indicated in FIGS. 4A and 4B, where the effective length of the optimized topology waveguide 23 underneath the 2D TMD 21 within the MZI structure is significantly shorter than a wire waveguide 3 underneath the 2D TMD 1 without optimization. The optimized topology at portion 24 allows a relatively straight waveguide absent curves that are required for longer waveguide lengths required without the optimized topology. The positioning of 2D TMDs 1 and 1' can be over both waveguide 3 and 3' paths or optionally one path may be absent a 2D TMD from a capacitance structure.

As shown, the MZI can have 2D TMDs 21 and 21' over the optimized topology portions 24 and 24' of waveguides 23 and 23' of both light paths, although this is not a necessity, as one waveguide can be under a capacitance structure and the other need not be under a capacitance structure where a 2D TMD varies in refractive index with the applied potential across the capacitor. The length between an entry beam splitter 27 and exit beam splitter 29 for the optimized topology can be separated by a shorter length than that between the beam splitters 17 and 19 of the non-optimized MZI. Obviously, the entire footprint can be lessened with many advantages for integration of many features. Waveguide lengths of the first and second waveguide paths need not be identical in length as shown, the first path can be shorter or longer in length than the second path.

Figure 5A:
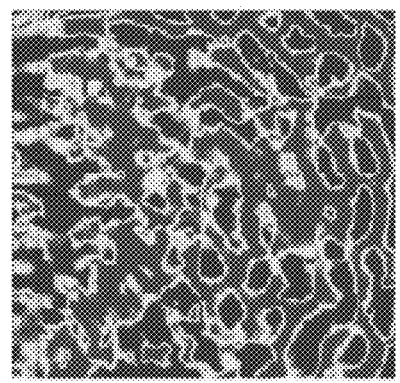
FIG. 5A is a length by width half symmetry portion of an optimized topology for the mode overlap portion of the waveguide situated under the 2D TMD.
Figure 5B:
FIG. 5B is a length by depth portion of an optimized topology for the mode overlap portion of the waveguide situated under the 2D TMD.
Figure 5C:
FIG. 5C is a full symmetry length by width optimized topology for the mode overlap portion of the waveguide situated under the 2D TMD, where the white features are $SiO_2$ and the black features are Si, according to an embodiment.

The topology optimized waveguide 23 can be provided with various details as that illustrated in FIGS. 5A-5C. FIG. 5A is a length by width half symmetry portion of an exemplary optimized topology design for the mode overlap portion of the waveguide situated under the 2D TMD that may be formed resulting from an extrusion projection method. FIG. 5B is a length by depth portion of an optimized topology for the mode overlap portion of the waveguide situated under the 2D TMD. FIG. 5C is a full symmetry length by width optimized topology for the mode overlap portion of the waveguide situated under the 2D TMD. FIG. 5C shows the combined half structures as a binary image where the black regions are the Si regions in the white $SiO_2$ matrix. The 2-D structure of FIGS. 5C and 5B has a footprint 3.8 microns wide and 1.8 microns thick and 13.8 microns long, respectively.

Figure 6:
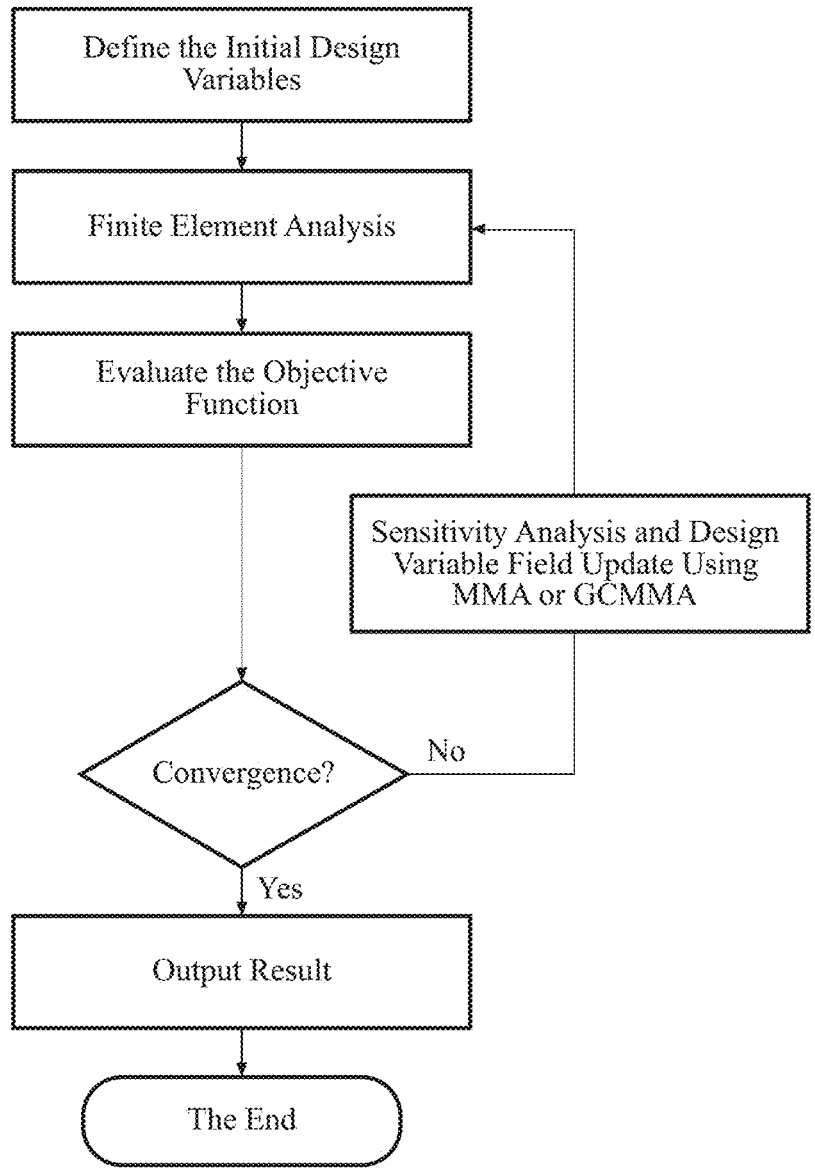
FIG. 6 is a flowchart of an exemplary gradient based algorithm using method of moving asymptotes (MMA) or globally convergent method of moving asymptotes (GCMMA) to optimize the topology.

In various aspects, methods for generating a specific design of a waveguide first include defining boundary conditions for an optimization domain. Certain methods may include performing a material interpolation process to determine where Si material resides. In various aspects, useful gradient-based topology algorithms may include a method of moving asymptotes (MMA) optimizer or a globally convergent method of moving asymptotes (GCMMA) optimizer. FIG. 6 is a flowchart of an exemplary gradient based algorithm using MMA or GCMMA in order to optimize the domain.

For the local optimization of a waveguide according to the present technology, one may begin with an objective function to have a light transmission coefficient about 0.8. This may be coupled with a constraint to include initial boundary conditions for the mode overlap. A finite element analysis (FEA) of an initial waveguide system can be performed with a prescribed design domain having an assigned objective function. In various aspects, the optimization procedure uses a gradient based optimization routine to minimize/maximize the objective function by changing the material distribution within the design domain. The optimized design can be obtained through the sensitivity analysis and the gradient-based optimization routine.

In various embodiments, the optimized waveguide is Si patterned within an insulating and near-IR transparent $SiO_2$ matrix. The patterned Si—SiO$_2$ device can be patterned by common microfabrication methods. A half-symmetry model with an extruded projection design can be used to generate the optimized the structure in two-dimensions. When the device is fabricated on an SOI wafer, for example, a silicon base layer of about 675 microns, followed by a silicon dioxide insulator layer of about 2 microns, and a silicon top layer of about 220 nm which is patterned. A photoresist is placed on the wafer, the resist is exposed by the light sources to pattern the top silicon layer to form the waveguide via UV lithography, e-beam or photo lithography. The wafer is subsequently developed, and etching is carried out to remove undesired regions of silicon to yield the patterned region after rinsing. A SiO$_2$ deposition is applied to encapsulate and form, for example, a buried waveguide in a layer forming the SIO$_2$ matrix. Other forms of waveguides are possible such as, but not limited to diffuse, wire, and strip-loaded.

Because of the size reduction possible in these photonic devices, many can be integrated into a larger electro-optic device. One or more photonic devices can be included in any electro-optic device that can employed for an electrically controlled optical signal. The electric component of the electro-optic device includes the capacitance structure and the optical component includes the waveguide of the photonic device. The optical component includes the wave source and any gratings in or outside of the photonic device. The electrical component includes any logic unit to control the potential provided to the capacitance structure and for any other switching or signal transmission or receiving the optical signal provided by the waveguide of the photonic device. These electro-optic devices can employ a logic unit configured to control the application of electrical potentials of the capacitance structures of the photonic device such that a π phase shift or an otherwise sufficient phase shift to induce a sufficiently constructive or destructive interference photonic signal.

The foregoing description is provided for purposes of illustration and description and is in no way intended to limit the disclosure, its application, or uses. It is not intended to be exhaustive or to limit the disclosure. Individual elements or components of a particular embodiment are generally not limited to that embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range, including the endpoints.

The headings (such as "Background" and "Summary") and sub-headings used herein are intended only for general organization of topics within the present disclosure and are not intended to limit the disclosure of the technology or any aspect thereof. The recitation of multiple embodiments having stated components is not intended to exclude other embodiments having additional components, or other embodiments incorporating different combinations of the stated components.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or components does not exclude other embodiments of the present technology that do not contain those elements or components.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

What is claimed is:

1. A photonic device, comprising:
   a substrate;
   at least one capacitance structure comprising:
      a first electrode comprising a transition metal di-chalcogenide monolayer sheet;
      a second electrode comprising a conductive material; and
      a dielectric layer disposed between the first electrode and the second electrode; and
   at least one photonic structure comprising:
   at least one waveguide disposed within a portion of the substrate, the waveguide having a mode overlap portion situated below the first electrode of the capacitance structure, the waveguide comprising a topology optimized structure arranged such that the waveguide and substrate are partitioned in three dimensions, the mode overlap portion having a length dimension of about 20 microns or less along the waveguide.

2. The photonic device of claim 1, wherein a refractive index of the first electrode depends upon an electrical potential difference applied to the capacitance structure, and wherein a mode overlap of the first electrode with the mode overlap portion of the waveguide causes a phase shift in a near-infrared optical wave within the waveguide.

3. The photonic device of claim 1, wherein the topology optimized structure comprises an extruded projection design.

4. The photonic device of claim 1, wherein the capacitance structure and the waveguide are configured as an optical phase shifter.

5. The photonic device of claim 1, wherein the photonic device comprises a portion of one or more of an optical network, a phased array, an optical delay line, a multiplexer, or a demux.

6. The photonic device of claim 1, wherein the transition metal di-chalcogenide monolayer sheet comprises:
   a transition metal selected from Mo, W, Ti, and Mn; and
   a chalcogen selected from S, Se, and Te.

7. The photonic device of claim 1, wherein the transition metal di-chalcogenide monolayer sheet comprises one or more of $WS_2$, $WSe_2$, $MoS_2$, $MoSe_2$, and $MoTe_2$.

8. The photonic device of claim 1, wherein the conductive material comprises a transparent conductive material.

9. The photonic device of claim 1, wherein the waveguide comprises Si, and is encapsulated in the portion of the substrate comprising $SiO_2$.

10. The photonic device of claim 1, wherein the mode overlap portion of the waveguide is less than about 40 nm below the first electrode.

11. The photonic device of claim 1, wherein the waveguide comprises a portion of a Mach-Zehnder interferometer (MZI) modulator, a microring resonator, or an optical modulator on a photonic chip.

12. A method of phase shifting, comprising:
   providing a photonic device comprising:
      a substrate;
      at least one capacitance structure comprising:
         a first electrode comprising a transition metal di-chalcogenide monolayer sheet;
         a second electrode comprising a conductive material; and
         a dielectric layer disposed at least partially between the first electrode and the second electrode; and
      at least one photonic structure comprising:
         at least one waveguide disposed within a portion of the substrate, the waveguide having a mode overlap portion situated below the first electrode of the capacitance structure, the waveguide comprising a topology optimized structure arranged such that the waveguide and substrate are partitioned in three dimensions;
   introducing an optical wave to the photonic device; and
   applying a potential across the capacitance structure to set a refractive index of a first electrode of the capacitance structure, such that a mode overlap of the wave and the first electrode over a length of less than about 20 microns causes a phase shift of the wave exiting the waveguide.

13. The method of claim 12, wherein the phase shift is a π phase shift.

14. The method of claim 12, wherein the phase shift is to the wave in a near-infrared range.

15. The method of claim 12, wherein the capacitance structure comprises the first electrode, a second electrode, and a dielectric layer disposed between the first electrode and the second electrode.

16. The method of claim 12, wherein the transition metal di-chalcogenide monolayer sheet comprises:
   a transition metal selected from Mo, W, Ti, and Mn; and
   a chalcogen selected from S, Se, and Te.

17. The method of claim 12, wherein the waveguide comprises Si encapsulated in the portion of the substrate comprising $SiO_2$.

18. The method of claim 12, wherein the capacitance structure and waveguide form a portion of one or more of an optical network, a phased array, and an optical delay line.

19. An electro-optical device, comprising:
   a substrate;
   an electric component comprising:
      a capacitance structure comprising:
         a first electrode comprising a transition metal di-chalcogenide monolayer sheet;
         a second electrode comprising a conductive material; and
         a dielectric layer disposed at least partially between the first electrode and the second electrode;
   an optic component comprising at least one waveguide disposed within a portion of the substrate, the waveguide having a mode overlap portion and comprising a topology optimized structure arranged such that the waveguide and substrate are partitioned in three dimensions, the mode overlap portion having a length dimension of about 20 microns or less along the waveguide; and
   a logic unit configured to control an application of an electrical potential difference between the first electrode and the second electrode,
   wherein the mode overlap portion of the waveguide is situated below the first electrode and the electrical potential difference applied to the capacitance structure defines a refractive index of the first electrode, such that a phase shift that induces a constructive or a destructive interference is produced in the waveguide situated below the first electrode.

* * * * *